Figure 1:
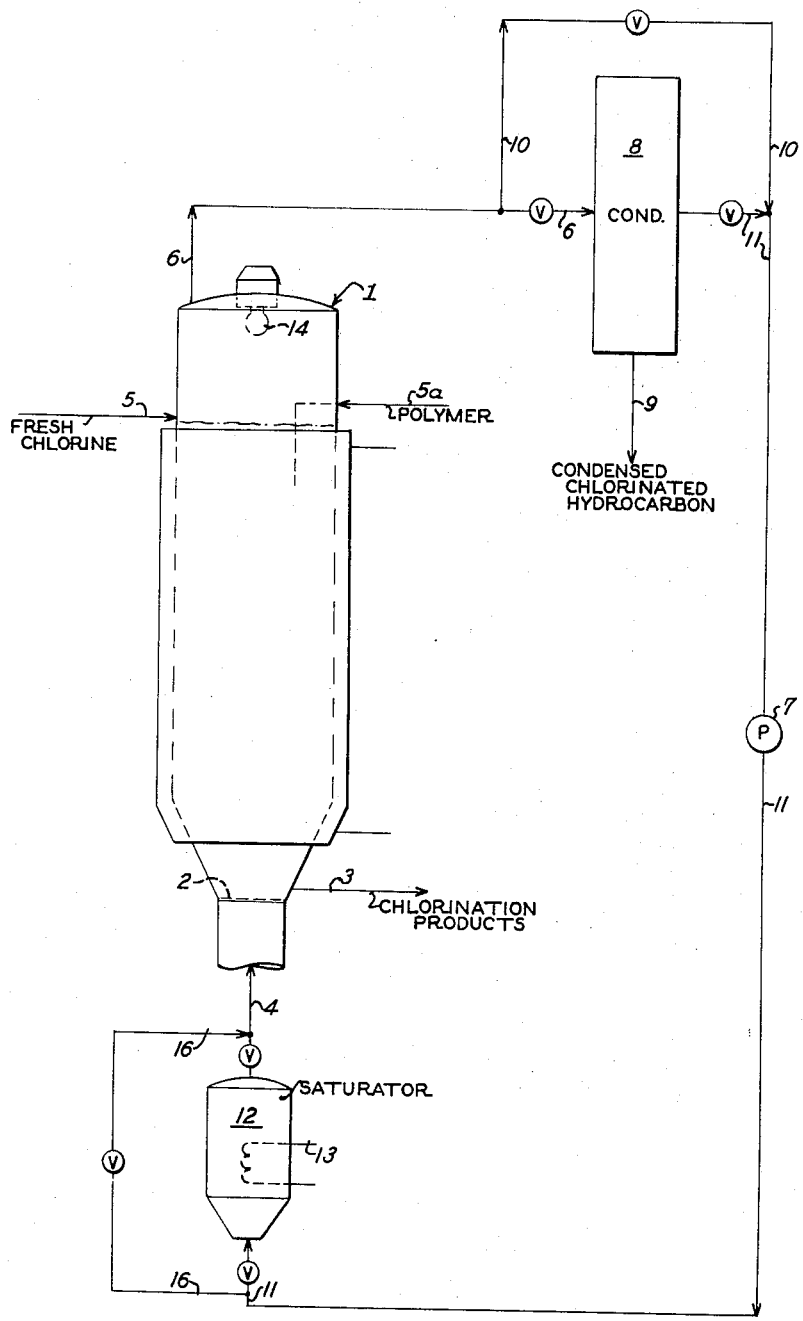

Jan. 9, 1968 G. BIER ETAL 3,362,896
PROCESS FOR THE POST-CHLORINATION OF POLYMERS OF VINYL
CHLORIDE USING RADIATION
Filed Oct. 14, 1964 2 Sheets-Sheet 2

INVENTORS
GERHARD BIER
HANS-EWALD KONERMANN
BY
Burgess, Dinklage &
Sprung
ATTORNEYS United States Patent Office 3,362,896
Patented Jan. 9, 1968

3,362,896
PROCESS FOR THE POST-CHLORINATION OF POLYMERS OF VINYL CHLORIDE USING RADIATION
Gerhard Bier, Troisdorf, and Hans-Ewald Konermann, Troisdorf-Oberlar, Germany, assignors to Dynamit Nobel Aktiengesellschaft, Troisdorf, Bezirk Cologne, Germany, a corporation of Germany
Filed Oct. 14, 1964, Ser. No. 403,949
Claims priority, application Germany, Oct. 15, 1963, D 42,708
12 Claims. (Cl. 204—159.18)

The subject of the invention is a process for the post-chlorination of polymers of vinyl chloride in liquid suspension, e.g. aqueous suspension, wherein, preferably, the liquid medium is simultaneously irradiated with light in the visible or short wave range. This process is characterized in that chlorine is used for the chlorination, which is wholly or partially saturated with chlorinated hydrocarbons.

The known processes for the post chlorination of polymers of vinyl chloride can be divided into:

(1) Homogeneous phase chlorination processes
(2) Heterogeneous phase chlorination processes
(3) Gel phase chlorination processes.

The prior art homogeneous phase chlorination processes, i.e. processes for the chlorination of polyvinyl chloride in solution, are performed industrially at temperatures above 100° C., sometimes, under pressure, and with the use of chloroform, carbon tetrachloride or tetrachlorethane as solvents, and result in acetone soluble products. The products, however, have a very poor thermal stability. This process is expensive by reason of the procedure necessary for isolating the product from the solution. Products of this process are used to a limited extent as raw materials for adhesives and varnishes.

Process of the second type include all chlorination processes in which either the polyvinyl chloride is suspended in an inert liquid phase, such as water or aqueous hydrochloric acid, and gaseous chlorine, sometimes with an inert gas added, is passed through the polyvinyl chloride suspension. In this process it can be observed that the speed of reaction rises to technically usable figures only above 60 to 70° C. It is true that the products obtained by these methods have a somewhat improved thermostability as compared with those of the first-mentioned process, but it is only slightly superior to the thermostability of the original polyvinyl chloride. If the thermostability of the starting polyvinyl chloride is compared, for instance, with the post chlorinated product at the processing temperatures required in each case, the original polyvinyl chloride is even clearly superior.

The third type of process, namely post chlorination in the so-called gel phase, represents a combination of the first process with the second, since the chlorination is performed both in an inert phase, an aqueous phase, for example, and in the presence of a solvent or swelling agent such as chloroform or carbon tetrachloride. In this case, the chlorinated hydrocarbon serves the purpose of opening up the polymer, by transforming it to a gel state, for a thorough chlorination. In contrast to the processes previously described, the chlorination of a polyvinyl chloride in the gel state takes place at high reaction speeds at just above room temperature.

In the gel phase chlorination processes of the prior art, the PVC or PVC copolymer is suspended in a mixture of swelling agents (chlorinated hydrocarbons) and the inert liquid suspending phase (or aqueous hydrochloric acid) and transformed to the swollen state. The swollen product is then chlorinated by the introduction of gaseous chlorine, usually supported by visible and ultraviolet radiation. The chlorination in these processes is characterized by a sharp reaction peak at the beginning, if the external conditions, such as intensity of agitation, the rate of flow of cooling water and the pressure, are kept constant. It is indeed possible to suppress these reaction peaks by throttling down the chlorine infeed or the speed of agitation, or by diluting the chlorine with inert gas, but this has no effect on the thermostability.

It has now been found that significantly more thermostable chlorination products of polymers of vinylchloride are obtained by an extremely simple and efficient process if the polymers of vinyl chloride are suspended in an inert, liquid, preferably aqueous system, and chlorinated by introducing chlorine gas containing chlorinated hydrocarbon vapors, preferably with irradiation by light in the visible and/or short wave spectrum. The charging of the chlorine gas with chlorinated hydrocarbons can be performed in a saturator, which is adjusted to 0° C. up to a temperature corresponding with the boiling point of the chlorinated hydrocarbons used, preferably in a range of 10–60° C., depending on the required amount of chlorinated hydrocarbon.

The course of the chlorination process of the invention is practically free of reaction peaks and falls off slightly as the chlorination progresses. The chlorination time depends substantially on the amount of chlorinated hydrocarbon in the chlorine. The lower the chlorinated hydrocarbon content is, the longer the reaction time will be.

In addition to the advantage of thermostability, this process offers additional advantages, especially as regards industrial production:

(1) Elimination of reaction peaks, thereby substantially simplifying control of the reaction, and making it possible substantially to reduce the size of the cooling and chlorine proportioning system.

(2) The introduced gaseous components may serve additionally as the medium for a gas agitation system, so that mechanical agitators, which are liable to breakdown and consume a lot of energy and may create sealing problems, can be eliminated, resulting in better reliability of operation.

(3) Greater space-time yields due to the elimination of steeping time.

(4) Economy due to elimination of steeping vats and apparatus.

(5) The total amount of swelling agents used in a given amount of chlorination time is reduced, and so is the time for which the overall quantity of swelling agents is subjected to the conditions of chlorination, resulting in smaller losses due to co-chlorination of swelling agents.

(6) It becomes possible to make the process continuous.

Appropriate swelling agents for use in the present invention are all partially chlorinated and/or perchlorinated hydrocarbons with about one to three carbon atoms. Swelling agents easy to remove from the post chlorinated polymers are preferred. Particularly advantageous is the use of chloroform or carbon tetrachloride as swelling agents. Mixtures of these agents can also be used.

Figure 2:
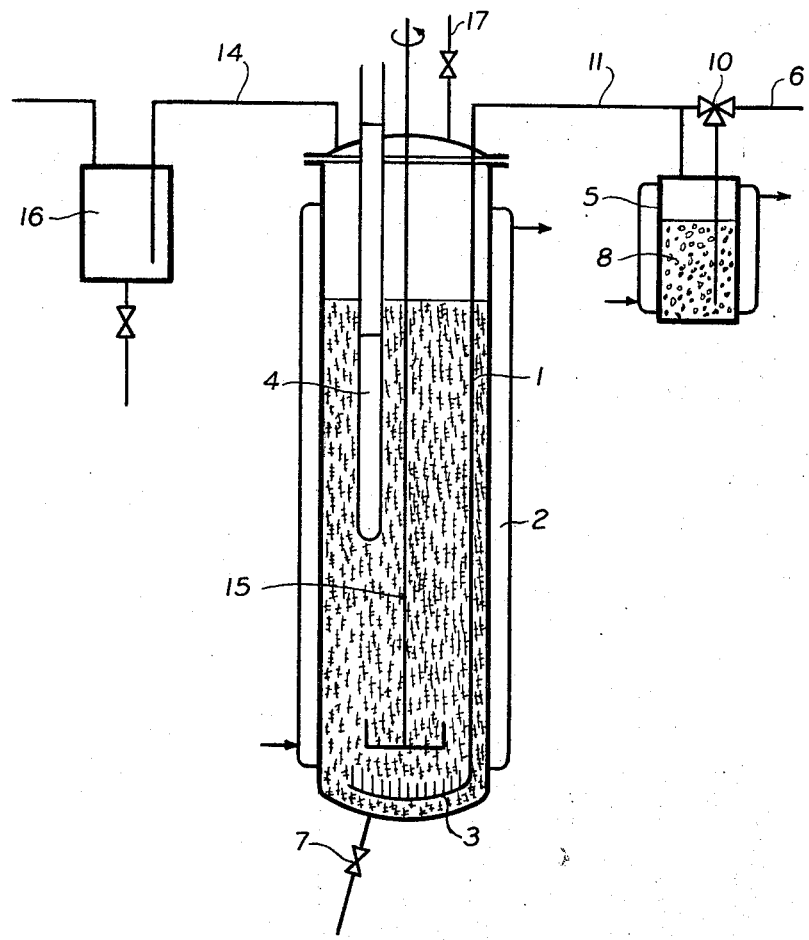

The chlorination process can employ flow sheets as is shown in FIG. 1 for a circulation process (Examples 1–3) and is in FIG. 2 for a non-circulation process (Examples 4–8). FIG. 1 shows a vertically disposed tubular reactor 1 with a jacket 2 for cooling or heating. The reactor has a bottom end terminating in a cone-shaped section having a feed mechanism 3 (sieve plate). At the height of the sieve plate is a lateral outlet connector 7 for carrying out the chlorination products. Underneath the sieve plate is the inlet line 11 for the gaseous products (e.g. chlorine, inert circulating gas, etc.), which on the one hand are reactants and on the other hand serve as a medium for the gas agitation. Accordingly, there is also between the condenser 12 and the pump 9 a connection 6 for feeding in fresh chlorine to replace the chlorine consumed in the chlorination, a connection 17 for introducing polymer, situated at the upper end of the tubular reactor, and an outlet 14 for sweeping gases. A third connection at the upper end of the reactor is for the circulating gas, which can be drawn off with a pump 9 through a condenser 12 having condensate drawoff 19 for the removal of condensed chlorinated hydrocarbon after the chlorination. For shut-down, to get the chlorinated hydrocarbon out of the system, the condenser 12 is used. The stream of gas is directed by means of a three-way valve 19. During normal operation pump 9 forces the gas mixture through saturator 5 filled with chlorinated hydrocarbons 8 and having a heating jacket, and then through the inlet line 11 back into the tubular reactor 1. Between pump 9 and inlet line 11 there is further situated a three-way valve 10 for a by-pass for sweeping the reactor with chlorine to remove oxygen. The system is as well equipped with a manometer 13 in the outlet line for the circulating gases for pressure control. The installation of the visible or ultraviolet light source can be done either concentrically downward from the reactor head, by lamp 4, or perpendicularly to the direction of flow, for example, in a number of short pieces of pipe set laterally. Connections (not shown) are also located on the reactor head and at the saturator for measurement of temperature. The chlorination reactor can be temperature controlled either through jacket 2 for heating and cooling, or through suitable heating means and an open water spray.

A flow sheet for conducting the post chlorination in a non-circulating manner is shown in FIG. 2. In this case a reactor 1 is used, having a jacket 2 for heating or cooling. The reactor is equipped with stirrer 15, a source 4 for the visible or ultraviolet light, an apparatus 3 for feeding the gaseous products, connections for carrying out the chlorination products 7 and for introducing polymer, an inlet line 11 and outlet line for gaseous products 14. Connections (not shown) are also located on the reactor head for controlling the temperature etc. A by-pass line for sweeping the reactor is provided at the saturator by means of a three-way valve. For the chlorination chlorine and inert gases enter through line 6, the saturator 5, which is equipped with a heating jacket, containing the chlorinated hydrocarbons 8, and through inlet 11 the reactor. Unreacted chlorine, gaseous acidic by-products and inert gases pass through outlet line 14 and alkaline wash 16.

The chlorine that is in circulation can, in modification of the process described, be diluted with an inert gas. A substantially improved mixing of the reactants can be achieved through dilution with an inert gas, such as nitrogen or carbon dioxide. Noble gases can also be used as the inert diluent gases, and also those gases which do not undergo any chemical change under the chlorination conditions described, such as hydrogen chloride etc.

Hereinafter a number of examples of the present process are described and compared with experiments according to prior art processes.

The thermostability was determined by the following method: 1 gram of an unstabilized specimen dried until its weight was constant was heated for 90 minutes in a glass cylinder placed in an oil bath of 170° C. The hydrochloric acid that formed as a result of decomposition was flushed into a tank of water by a current of nitrogen at 170° C., which flowed at constant speed over the specimen during the measurement. The split-off hydrochloric acid was then measured either by titration with 1/100 N caustic soda solution or by conductivity measurement. The amount of hydrochloric acid in milligrams which was split off from one gram of dry substance was then taken as a measure of the thermostability of the product. This method is characterized by high accuracy and good reproducibility, and corresponds to German Engineering Standards (DIN) Draft 53381 of October 1962, page 3 (published in "Kunststoffe" 52 (1962) p. 708).

The polymers of vinyl chloride which can be processed according to the invention include polymers of vinyl chloride alone and copolymer of vinyl chloride and other monomers, for example, copolymers of vinyl chloride and other monomers as can be post chlorinated by the above-mentioned prior art processes. The process of the invention will work for copolymers as to which known processes will work.

As to temperature and pressure, the conditions for the known processes apply to the present invention.

EXAMPLE 1

425 g. of polyvinyl chloride of the suspension type, having a K. value of 68 (after H. Fikentscher, Cellulosechemie 13, 1932, p. 58), moist from filtration after polymerization, with a water content of 24 wt. percent, were placed in the above-described chlorination apparatus of 4 liters volume together with 900 ml. of concentrated hydrochloric acid and 300 ml. of water. The hot water jacket heating system was adjusted to 35° C.; the entire apparatus was cleaned of air by passing 20 l. of chlorine through the liquid, without passing it through the liquid, and then a 70 watt ultraviolet lamp was turned on. Chlorine was then passed through a saturator filled with chloroform and heated to 40° C. The heated chlorine, containing chloroform vapor, was circulated by a pump through the system. After a total of 56 liters of chlorine had been fed into the chlorine circulation system in the course of 85 minutes, the ultraviolet radiation was turned off and the apparatus was rendered free of chlorine by nitrogen. During the chlorination, a total of 185 g. of chloroform were absorbed by the chlorine in circulation.

The chlorination product, washed neutral with water and purified by steam distillation and then dried, had the following characteristics:

Chlorine content: 66.9%.
Vicat heat: 119.5° C.
Thermostability: $25.10^{-2}$ mg. HCl/g. and 125 minutes, respectively.

The starting PVC had a thermostability of only $148.10^{-2}$ mg. HCl/g. and 25 minutes, respectively.

EXAMPLE 2

425 g. of suspension PVC (K value 68) were chlorinated as in Example 1. The chloroform saturator was adjusted in this experiment to 38° C. The chlorination time was 75 minutes; the amount of chloroform absorbed by the chlorine in circulation was 175 g. The chlorination product, likewise washed neutral with water and purified by steam distillation, had the following characteristics:

Chlorine content: 66.2%.
Vicat heat: 118° C.
Thermostability: $36.10^{-2}$ mg. HCl/g. and 81 minutes, respectively.

EXAMPLE 3

425 grams of suspension PVC, K-value 68, were chlorinated as in Example 1. The temperature of the chloroform saturator was adjusted in this experiment to 35° C. The chlorination time was 90 minutes. The amount of chloroform taken up by the chlorine in circulation was 125 g. For the purpose of the extensive recovery of the chloroform, after the chlorination had ended and the source of irradiation had been shut off, the reaction mixture was heated to 60° C. while maintaining the chlorine circulation, and the gas effluent was passed through a water cooled condenser to separate the chloroform. After about 90 minutes, 110 grams of chloroform collected in the receiver of the condenser, which corresponds to a recovery of about 88%.

The chlorination product, after being processed as in Example 1, had the following characteristics:

Chlorine content: 66.4%.
Vicat heat: 115° C.
Thermostability: $27.10^{-2}$ mg. HCl/g. and 112 minutes, respectively.

EXAMPLE 4

425 grams of suspension PVC, K value 68, with a water content of 23.8%, were stirred into 1400 ml. of water contained in a 4-liter glass flask and equipped with a gas inlet tube, thermometer, agitator and gas outlet connector, and then treated with chlorine under radiation from a 70-watt UV lamp at a reaction temperature of 50° C. After the addition of 20 liters of chlorine to flush out the apparatus, the chlorine current was reversed so that it had to pass through a saturator filled with chloroform and heated to 35° C. After the feeding in and consumption of a total of 84 l. of chlorine, and after a period of 170 minutes, the chlorine feed and the UV lamp were shut off, and then the apparatus was flushed free of chlorine with nitrogen. During the chlorination, a total of 120 g. of chloroform were absorbed by the chlorine reactant.

The chlorination product, after being washed neutral with water and purified by steam distillation, had the following characteristics:

Chlorine content: 69.3% Cl.
Vicat heat: 130° C.
Thermostability: $13.10^{-2}$ mg. HCl/g. and 225 minutes, respectively.

The thermostability of the starting product, for comparative purposes, amounted to $245.10^{-2}$ mg. HCl/g. and 22 minutes, respectively.

EXAMPLE 5

425 g. of suspension PVC, K value 68, with a water content of 23.8%, were chlorinated as in Example 4. The apparatus was flushed with 20 l. of chlorine, and 80 l. of chlorine were consumed at a total chloroform content in the chlorine reactant of 180 g. and a saturator temperature of 35° C. The reaction temperature was 49° C., and the time of reaction was 170 minutes.

The product, when washed neutral with water and purified by steam distillation, had the following characteristics:

Chlorine content: 66.7%.
Vicat heat: 118° C.
Thermostability: $20.10^{-2}$ mg. HCl/g. and 178 minutes, respectively.

The thermostability of the starting material amounted, for example, to: $245.10^{-2}$ mg. HCl/g. and 22 minutes, respectively.

EXAMPLE 6

425 g. of suspension PVC, K value 68, with a water content of 23.8%, were chlorinated as in Example 4 but with the modification that the chlorine is passed through a saturator filled with chloroform and a second saturator filled with carbontetrachloride, both adjusted to a temperature of 35° C. During the chlorination 51 g. of chloroform and 77 g. of carbontetrachloride were absorbed by 70 l. chlorine used for the reaction.

The product, when washed neutral with water and purified by steam distillation, had the following characteristics:

Chlorine content: 68.5% Cl.
Vicat heat: 117° C.
Thermostability: $26.6.10^{-2}$ mg. HCl/g. and 116 minutes, respectively.

The thermostability of the starting product is the same as in Example 4.

EXAMPLE 7

425 g. of suspension PVC, K value 68, with a water content of 23.8%, were chlorinated as in Example 4 but with the modification that the saturator was filled with a mixture consisting of chloroform and carbontetrachloride of a weight ratio of 40:60. The saturator was adjusted to 35° C. 82 ml. of the above described mixture were absorbed by 70 l. of chlorine used by the reaction.

The product, when washed neutral with water and purified by steam distillation, had the following characteristics:

Chlorine content: 68.3%.
Vicat heat: 118° C.
Thermostability: $21.9.10^{-2}$ mg./HCl/g. and 141, respectively.

The thermostability of the starting product is the same as in Example 4.

EXAMPLE 8

10.5 kg. of suspension PVC, K value 68, with a water content of 24.1% were suspended in 40 liters of water. The chlorination has been conducted in an enamel-coated 100 liters reaction vessel, irradiation resulting from a 1100-watt UV lamp. After the addition of 1.8 kg. of chlorine to flush out the apparatus the chlorine current was reversed so that it had to pass through a saturator filled with chloroform and heated to 37° C. After the feeding in and consumption of 2.4 kg. chlorine and 2.75 kg. chloroform at a reaction temperature of 43° C. the chlorine current was reversed again so that it had to pass the by-pass line of the saturator and an additional amount of 3.4 kg. chlorine free from chlorinated hydrocarbons were fed in and consumed.

The chlorination product washed neutral with water and purified by steam distillation and than dried, had the following characteristics:

Chlorine content: 67.2%.
Vicat heat: 117° C.
Thermostability: $17.10^{-2}$ mg. HCl/g. and 170 minutes, respectively.

Vicat heat is a standard measure of dimenisonal stability under influence of heat and is defined in DIN (German Industrial Standard) 57,302.

EXAMPLES 9a–c

In this example, three runs according to the prior art were carried out.

(a) 425 g. of suspension PVC, K value 68, with a water content of 24 wt. percent, were stirred for 4 hours together with 900 ml. conc. hydrochloric acid, 300 ml. water and 180 g. chloroform into a 4-liter glass flask equipped with a gas inlet tube, thermometer, agitator and gas outlet connection. The material was then allowed to stand for 15 hours. Then, at a reaction temperature of 49° C., and under ultraviolet radiation from a 70 watt high pressure mercury lamp, 56 liters of chlorine were introduced, after the apparatus had been flushed with chlorine. The chlorination time amounted to 65 minutes. The chlorination product, when washed neutral with water and purified by steam distillation, had the following characteristics:

Chlorine content: 66.9%.
Vicat heat: 121° C.
Thermostability: $101.10^{-2}$ mg. HCl/g. and 35 minutes, respectively.

(b) 425 g. of suspension PVC, K value 68, with a water content of 24 wt. percent were chlorinated as in Example 9a, except that the chlorination was commenced directly after a stirring period of 4 hours. The chlorination time amounted to 210 minutes. The chlorination product, purified as in Examples 1 and 9a, had the following characteristics:

Chlorine content: 65.9%.
Vicat heat: 119° C.
Thermostability: $71.10^{-2}$ mg. HCl/g. and 42 minutes, respectively.

(c) 425 g. of suspension PVC, K value 68, with a water content of 24 wt. percent, were chlorinated as in Example 9a, except the 4-hours stirring step and the 15 hours standing step were eliminated. The reaction mixture was heated to 40° C. for one hour before the chlorination. The chlorination time amounted to 58 minutes. The chlorination product, when purified as in Examples 1 and 9a, had the following characteristics:

Chlorine content: 65.7%.
Vicat heat: 119° C.
Thermostability: $63.10^{-2}$ mg. HCl/g. and 50 minutes, respectively.

Comparison of these chlorination products shows that the products of the process of the invention (Examples 1–8) have about twice the thermostability at comparative vicat heat values. This advantage is perceptible in the form of smaller amounts of added stabilizer and higher working temperatures, in the case of the plastic working of the products.

Percentages herein are weight percent unless otherwise indicated.

What is claimed is:
1. Process for post chlorination of polymer vinyl chloride, in the presence of irradiation by light in the range of the visible and short wave spectrum, which comprises:
    (a) providing said polymer in suspension in an aqueous medium,
    (b) introducing into said medium containing the polymer a gas mixture consisting essentially of chlorine and chlorinated hydrocarbon for simultaneous swelling and chlorinating said polymer.
2. In the process for post chlorination of polymer of vinyl chloride in the presence of irradiation by light in the range of the visible and short wave spectrum wherein the polymer while suspended in aqueous medium is contacted with chlorine, which is introduced in gaseous state, the improvement which comprises: including in said chlorine gas, in admixture therewith, chlorinated hydrocarbon for simultaneous swelling and chlorinating said polymer.
3. In the process for post chlorination of polymer vinyl chloride in the presence of irradiation by light in the range of the visible and short wave spectrum wherein the polymer while suspended in aqueous medium is contacted with chlorine, which is introduced in gaseous state, in the presence of a chlorinated hydrocarbon swelling agent for the polymer, the improvement which comprises:
    (a) providing said polymer in suspension in an aqueous medium substantially free of chlorinated hydrocarbon,
    (b) introducing into said medium containing the polymer a gas mixture consisting essentially of chlorine and chlorinated hydrocarbon for simultaneous swelling and chlorinating said polymer.
4. Process according to claim 3, wherein the chlorinated hydrocarbon is chloroform.
5. Process according to claim 3, wherein the chlorinated hydrocarbon consists of a mixture of chloroform and carbon tetrachloride.
6. Process according to claim 3, wherein said gas mixture is produced by contacting chlorine gas with the chlorinated hydrocarbon in liquid phase, which is adjusted to 0° C. up to a temperature coersponding with the boiling point of the chlorinated hydrocarbons used.
7. In the process for post chlorination of polymer of vinyl chloride in the presence of irradiation by light in the range of the visible and short wave spectrum wherein the polymer is swelled with chlorinated hydrocarbon and the swelled polymer suspended in aqueous medium is contacted with chlorine gas for said post chlorination, the improvement which comprises, throughout said process, supplying the chlorinated hydrocarbon for swelling of the polymer by including chlorinated hydrocarbon in admixture with said chlorine gas for simultaneous swelling and chlorinating said polymer.
8. Process according to claim 7, said process being operated by circulating chlorine gas, and replacing in the circulating gas chlorine and the chlorinated hydrocarbon used for the chlorination by adding chlorine gas and chlorinated hydrocarbons.
9. Process according to claim 7, wherein swelling agent is removed from the polymer following post chlorination thereof by passing chlorine gas substantially free of swelling agent or only partially saturated with swelling agent through said aqueous medium.
10. Process according to claim 7, wherein said chlorine gas is admixed with an inert gas.
11. Process according to claim 1, wherein following said contacting, chlorine gas substantially free of said chlorinated hydrocarbon is contacted with the polymers.
12. Process according to claim 6, wherein said temperature is about 10–60° C.

References Cited
FOREIGN PATENTS
1,220,932    1/1960    France.

OTHER REFERENCES

Okamura et al., Annual Report of the Japanese Association for Radiation Research on Polymers, vol. 1, page 220, "Halogenation of Polymers by Irradiation," Oct. 10, 1960.

MURRAY TILLMAN, *Primary Examiner.*

SAMUEL H. BLECH, *Examiner.*

R. TURER, N. F. OBLON, *Assistant Examiners.*